United States Patent

[11] 3,632,441

[72] Inventor Norman Bilow
 Los Angeles, Calif.
[21] Appl. No. 856,237
[22] Filed Aug. 8, 1969
[45] Patented Jan. 4, 1972
[73] Assignee The United States of America as represented by the Secretary of the Air Force

[54] COATED METAL CONDUCTORS
 3 Claims, No Drawings
[52] U.S. Cl...................................... 117/218,
 117/128.4, 117/161 P, 117/232
[51] Int. Cl....................................... B44d 1/42,
 H01b 3/30
[50] Field of Search............................ 117/218,
 232, 75, 161 P, 122 P, 122 PA, 122 PF; 260/78
 TF, 47 CP; 174/109, 120; 161/175, 214

[56] References Cited
 UNITED STATES PATENTS
3,408,453 10/1968 Shelton ....................... 117/218
3,414,543 12/1968 Paufler ........................ 260/47 CP
3,422,215 1/1969 Humes ........................ 117/218
3,424,718 1/1969 Angelo ........................ 117/161 P
3,492,270 1/1970 Parish......................... 161/214
3,518,232 6/1970 Bell ............................ 260/47 CP Primary Examiner—William D. Martin
Assistant Examiner—Raymond M. Speer
Attorneys—Harry A. Herbert, Jr. and Alvin B. Peterson ABSTRACT: Coated metal conductors are made by coating the conductor with a polyimide resin and prepolymers which are prepared by the reaction of a tetra ester of benzophenonetetracarboxylic acid (or anhydride) and a tetraamine. The prepolymers thus prepared may be dissolved in a solvent such as chloroform or benzene, sprayed onto the surface of a polyimide film, and cured to a tack-free but pressure-sealable fusible state by the application of heat. Polyimide films thus coated may then be placed together on their adhesive faces and sealed under heat and pressure. The adhesives of this invention are able to withstand the same high temperatures that the polyimide films can. Thus, the sealed films are useful in such applications as wire insulation and contour cable where temperatures of from 600°–800° F. are encountered.

COATED METAL CONDUCTORS

BACKGROUND OF THE INVENTION

1. Field of the Invention

This invention is primarily in the field of insulated, metal, electrical conductors. Nonelectrical uses of the coating of this invention are indicated where chemical resistance, high temperature stability, smoothness, adherence to metal, resistance to abrasion, or resistance to solvents is required.

Various materials such as fillers, plasticizers, coloring agents, etc., may be incorporated in the coating of this invention as is conventional in the art.

2. Description of the Prior Art

Polyimide film is currently available commercially and is capable of withstanding temperatures of 600° F. in air for prolonged periods of time. For many applications it is necessary to bond sheets of this film together in order to take advantage of its high-temperature properties. Conventional adhesives such as epoxides, phenolics, and polyurethanes have been used for this purpose and have been found to fail at temperatures much below the temperatures which the polyimide film can withstand. Consequently, the film potential cannot be realized in bonded compositions utilizing the conventional adhesives. Even temperatures as low as 400° F. are excessive for the adhesives mentioned above.

Currently used high-temperature insulation for electric wire consists of polyimide film sealed with FEP Teflon. This insulation cannot be used at temperatures above about 500° F. because the FEP Teflon softens and loses its sealant properties at that temperature. (FEP Teflon is not to be confused with TFE Teflon. TFE Teflon is thermally stable up to 800° F. but cannot be used as a sealant or adhesive because it cannot be processed for this type of application.)

Polyimide adhesives are also available commercially and can withstand temperatures of 600° F. However, when polyimide adhesives are used with polyimide film it is extremely difficult to produce a void free interlayer due to evolution of water or other volatiles such as alcohol during the cure process. Furthermore, when polyimide adhesive is used with polyimide film, the moisture resistance of the film is not improved by the adhesive. Thus, there has been a search for adhesives which will withstand the same high temperature of polyimide film and may be used to bond together polyimide film.

BRIEF SUMMARY OF THE INVENTION

This invention solves problems previously existing in the art by providing polyimide films coated with adhesive which may be used to insulate metal conductors and which will yield an insulation which has a void free interlayer which will withstand temperatures of 600° F. for prolonged periods of time and temperatures of 800° F. for short periods of time. Also, the adhesives of this invention improve the moisture resistance of polyimide film.

The adhesives of this invention are prepared according to the following condensation reaction:

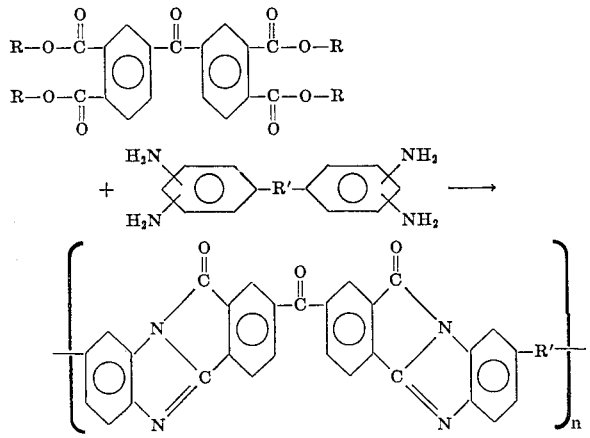

wherein R is $CH_3$, $C_2H_5$, $C_3H_7$, $C_4H_9$, or a mixture thereof; and wherein R' may be the completion of a single bond between phenyl rings or a member selected from the group consisting of O, S, $CH_2$, and $SO_2$. The two amino groups of each ring of the tetraamine must be vicinyl.

The letter $n$ in the foregoing formula is to signify an integer which varies according to the degree of polymerization. The adhesive is prepared in the form of a prepolymer which is soluble in a solvent such as chloroform or benzene. In use, a solution of the prepolymer is sprayed on a polyimide film, partially cured by heat and then coated polyimide films are placed together on their adhesive faces and a final cure carried out by applying heat and pressure. Thus, in the prepolymer stage $n$ has a relatively low value in comparison with its high value in the finally cured state. In the prepolymer state, $n$ has a value such that the prepolymer has an inherent viscosity of about 0.5 at room temperature when 2.5 grams of prepolymer are dissolved in 150 ml. of dimethylformamide.

DESCRIPTION OF THE PREFERRED EMBODIMENT

Suitable reactants in the preparation of the adhesives of this invention are (1) tetra esters of benzophenonetetracarboxylic acid (or anhydride) such as the methyl, ethyl, propyl, butyl, and mixed esters involving any of the four mentioned groups; and (2) tetraamines such as 3,3'-diaminobenzidine, 2,2',3,3'-tetraaminodiphenyl oxide, 3,3',4,4'-tetraamino diphenyl oxide, 2,2',3,3'-tetraamino diphenyl sulfide, 3,3',4,4'-tetraamino diphenyl sulfide, 2,2',3,3'-tetraamino diphenyl methane, 3,3',4,4'-tetraamino diphenyl methane, 2,2',3,3'-tetraamino diphenyl sulfone, and 3,3',4,4'-tetraamino diphenyl sulfone. The amines must have two amino groups per ring and the two amino groups must be vicinyl (on adjacent ring carbon atoms). The 3,3',4,4'-derivatives are preferred.

The following examples will serve to indicate to those skilled in the art the best mode of practicing the invention.

EXAMPLE I

Tetra Ester

Benzophenonetetracarboxylic acid dianhydride (193 g., 0.6 mole) was slurried in 800 ml. of absolute ethanol. Concentrated sulfuric acid (28 ml.) was added dropwise to the slurry. The reaction mixture was heated to reflux temperature and stirred for 24 hours. The crude tetraethyl ester formed during the reaction period was concentrated by distilling off ethanol (550 ml.). Benzene (400 ml.) was added to the concentrated crude product and the mixture was heated to reflux for 96 hours to remove water of condensation by azeotropic distillation. Fresh ethanol was added periodically to the reaction vessel during the azeotropic distillation.

The final crude product, in benzene, was washed several times with water and shaken with saturated sodium bicarbonate solution to remove the partially esterified acid. The benzene solution of tetra ester was then dried over anhydrous magnesium sulfate and the benzene removed by vacuum distillation. The product weighed 224 grams (79 percent of theoretical) and had 1.5 equivalent percent free carboxyl groups by analysis. Methyl, propyl, and butyl esters may be prepared by substituting the appropriate alcohol for ethanol in this example.

EXAMPLE II

Adhesive Prepolymer

The tetraethyl ester prepared in example I (141 g., 0.30 mole) was stirred and heated under argon to 190° C. and solid 3,3'-diaminobenzidine (64.2 g., 0.30 mole) was added. The mixture was stirred under argon at 180° C. for 80 minutes while the vessel was periodically evacuated to remove ethanol formed by the reaction (9.5 ml. of ethanol were collected in a cold trap). The product was then colled rapidly in an ice bath and ground to a fine powder in a mortar. The powdered prepolymer had an inherent viscosity of 0.49 at room temperature (taken in dimethylformamide solution at a concentration of 2.5 g./100 ml.). The tetramethyl, tetrapropyl, tetrabutyl, or mixed tetra esters may be used in lieu of the tetraethyl ester of this example.

EXAMPLE III

Fifty grams of the adhesive prepolymer prepared according to example II was dissolved in 150 ml. of chloroform. The solution was used to spray a coat of adhesive over sheets of polyimide film. The coated polyimide films were air-dried and then heated under nitrogen to a temperature of 200° C. for 60 minutes. Two sheets were then placed together (adhesive sides in contact) and cured at 300° C. for 4 hours at 100 p.s.i. The laminated films had a virtually void free interlayer. Benzene may be used in lieu of the chloroform solvent of this example.

EXAMPLE IV

T-peel specimens prepared as in example III were heated in air at 600° F. for 4 hours and were then tested at ambient temperature and at 600° F. The adhesive did not fail in the tests—only the polyimide failed. Another test was carried out at 800° F. after aging for 1 hour at 800° F. Here also, the adhesive did not fail, only the polyimide film failed.

EXAMPLE V

Other prepolymers were prepared according to the method of example II except that other amines such as tetraamino diphenyl oxide, tetraamino diphenyl sulfide, tetraamino diphenyl sulfone, and tetraamino diphenyl methane having two amino groups per phenyl ring and with the amino groups vicinyl were used in lieu of the 3,3'-diaminobenzidine of example II. These prepolymers also produced excellent adhesives when used according to the method of example III and tested under the conditions of example IV.

USE OF THE INVENTION

The foregoing specification has primarily been a description of the preparation of adhesive prepolymers and a description of how the adhesives may be applied as a coating on sheets of polyimide film so that the sheets may be bonded together. To use adhesive coated polyimide film for wire wrap insulation, one may prepare a polyimide film in the form of a tape, coat one surface of the film with the adhesive, and wrap the tape around a metal conductor, in a wire wrapping machine. Wrapping places the adhesive-coated surface of the tape in contact with the uncoated surface of the tape and the two surfaces may then be sealed by applying the heat and pressure conditions set forth above. Multiple layers of coated film may be wrapped around the conductor with each successive layer being placed with its adhesive coated surface face down against the layer immediately below it. In this manner insulation having any desired thickness may be built up.

The polyimide films coated in the foregoing examples were polyimide films manufactured by Du Pont and sold under the trade name "Kapton." Such films are of course familiar to those in the business of manufacturing insulated electrical wire as are wire wrapping machines.

EXAMPLE VI

A second 50 of prepolymer obtained from the condensation of the tetraethylester of benzophenonetetracarboxylic acid and 3,3'-diaminobenzidine was "advanced" at 200° C. (392° F.) for 25 minutes in nitrogen, during which time its inherent viscosity increased from 0.46 to 0.56. The viscosity determination was made in dimethylformamide at a concentration of 2.5 g./100 ml. The polymer then was dissolved in dioxane (50 g./180 ml.) to yield a 28 percent solids content lacquer and this was subsequently used to coat 134 feet of Kapton polyimide tape (3 mils thick). One hundred thirty-four feet of coated tape was prepared and B-staged for 5 minutes in argon at a temperature maximum of 280° C. (536° F.). This was taken up on a roll with a tension of 150 to 200 g.

The 280° C. B-staged tape was wrapped on multifilament silver coated copper wire using a taping head speed of 140 r.p.m. and a line speed of 2.5 feet to 3.5 feet per minute. The wrapping temperature was about 349° C. (660° F.) and the heat was directed at the location of the bend of tape around the wire inside the wrapping spindle. No crazing or uneven surfaces were produced.

Sections of wire were run through the curing oven under the different conditions shown below:

TABLE I

| B-stage temperature | Wrap temperature °F. | Wrap temperature °C. | Tape speed, ft./min. | Total cure time, min. |
|---|---|---|---|---|
| Wire I, maximum 280° C.: | | | | |
| a | 700 | 371 | 1 | 15 |
| b | 800 | 427 | 3 | 5 |
| c | 900 | 482 | 3 | 5 |

Postcures were subsequently carried out on all of these wire samples.

Samples of wire were postcured as shown below and subsequent dielectric test results are also shown in table II. These dielectric tests were made on wire soaked in water at ambient temperature of 16 to 24 hours. Results of these tests show the insulation resistance of the better wires was $1-2\times10^6$ megohms ($10^{12}$ ohms or higher) at 500 volts DC and dielectric strength was 10,000–11,000 volts. The best wires were those B-staged up to 280° C. (536° F.), cured at 371° C. (700° F.) for 15 minutes, and postcured in argon for 4 hours at 316° C. (600° F.) or 371° C. (700° F.). wire which was B-staged at 350° C. (622° F.) did not appear to flow sufficiently well to seal effectively and wire cured at 482° C. (900° F.) appeared to be porous due to the excessively rapid evolution of condensation volatiles.

The insulation resistance of the cured coated wires was determined as a function of temperature, using (1) dry wire, (2) water-soaked wire (16 hours), and (3) wire which had been exposed to 95 percent relative humidity at 85° C. (185° F.) for 28 days.

TABLE II.—ELECTRICAL PROPERTIES OF WIRES POSTCURED IN ARGON UNDER VARIOUS CONDITIONS

[280° C. B-stage wire]

| Wire No. | Initial cure Time, min. | Initial cure Temp., °F. | Post cure Time, min. | Post cure Temp., °F. | Insulation resistance, megohms at 500 v. DC | Dielectric strength 1 minute, 2,500 v. AC | Dielectric strength Maximum volts AC, kv. |
|---|---|---|---|---|---|---|---|
| IIa | 15 | 700 | 15 | 700 | $1.04\times10^6$ | Passed | |
|  | 15 | 700 | 45 | 700 | $1.79\times10^6$ | do | |
|  | 15 | 700 | 30 | 600 | $1.26\times10^6$ | do | |
|  | 15 | 700 | 60 | 600 | $0.67\times10^6$ | do | 10.5 |
|  | 15 | 700 | 120 | 600 | $1.00\times10^6$ | do | |
| IIb | 5 | 800 | 15 | 700 | $2.00\times10^2$ | Passed | |
|  | 5 | 800 | 45 | 700 | 62.5 | do | |
|  | 5 | 800 | 30 | 600 | 1.24 | do | 10.0 |
|  | 5 | 800 | 60 | 600 | $2.28\times10^6$ | do | 11.0 |
|  | 5 | 800 | 120 | 600 | $2.06\times10^6$ | do | |
|  | 5 | 800 | 240 | 600 | $2.00\times10^6$ | do | |

Table II—Continued

| IIc | 5 | 900 | 15  | 700 | 0.247 | Passed | 10.0 |
|-----|---|-----|-----|-----|-------|--------|------|
|     | 5 | 900 | 45  | 700 | 0.312 | do     |      |
|     | 5 | 900 | 30  | 600 | 0.595 | do     |      |
|     | 5 | 900 | 60  | 600 | 0.250 | do     |      |
|     | 5 | 900 | 120 | 600 | 0.247 | do     |      |
|     | 5 | 900 | 240 | 600 | 12.5  |        |      |

I claim:

1. A metal conductor coated with multiple layers of polyimide film and a cured adhesive resin, said resin being the condensation product of a tetra ester of benzophenonetetracarboxylic acid and a tetraamine; said tetra ester having the general structure:

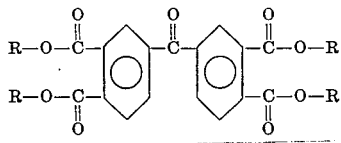

wherein R is selected from the group consisting of $CH_3$, $C_2H_5$, $C_3H_7$, $C_4H_9$, and mixtures thereof; and said tetraamine being selected from the group of compounds having the general structure:

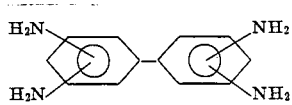

and

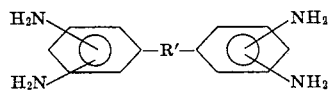

wherein R' is selected from the group consisting of O, S, $CH_2$, and $SO_2$; and wherein the two amine groups of each phenyl ring are vicinyl, said cured adhesive resin being void free.

2. The coated metal conductor according to claim 1 wherein the tetra ester is the tetraethyl ester and wherein the tetraamine is 3,3'-diaminobenzidine.

3. An insulated conductor comprising a metallic element coated with multiple layers of:
   a. polyimide film; and
   b. a void-free, cured adhesive resinous composition comprising the condensation product of a tetra ester selected from the group consisting of tetramethyl benzophenonetetracarboxylate, tetraethyl benzophenonetetracarboxylate, tetrapropyl benzophenonetetracarboxylate, and tetrabutyl benzophenonetetracarboxylate; and a tetraamine selected from the group consisting of 3,3'-diaminobenzidine, 2,2',3,3'-tetraamino diphenyl oxide, 3,3',4,4'2,2',3,3'-tetraamino diphenyl sulfide, 3,3',4,4'-tetraamino diphenyl sulfide, 2,2',3,3'3,3',4,4' tetraamino diphenyl methane, 2,2',3,3'-tetraamino diphenyl sulfone, and 3,3',4,4'-tetraamino diphenyl sulfone.

* * * * *

UNITED STATES PATENT OFFICE
CERTIFICATE OF CORRECTION

Patent No. 3,632,441    Dated January 4, 1972

Inventor(s) Norman Bilow

It is certified that error appears in the above-identified patent and that said Letters Patent are hereby corrected as shown below:

Column 6, line 25, after "oxide", insert --3,3',4,4'-tetraamino diphenyl oxide,--; line 26, change "3,3',4,4',2,2',3,3'-tetraamino" to read --2,2',3,3'-tetraamino--; line 28, change "2,2',3,3',3,3', 4,4'" to read --2,2',3,3'- --; line 29, after "methane," insert --3,3',4,4'-tetraamino diphenyl methane, --.

Signed and sealed this 6th day of August 1974.

(SEAL)
Attest:

McCOY M. GIBSON, JR.
Attesting Officer

C. MARSHALL DANN
Commissioner of Patents